Figure 1:
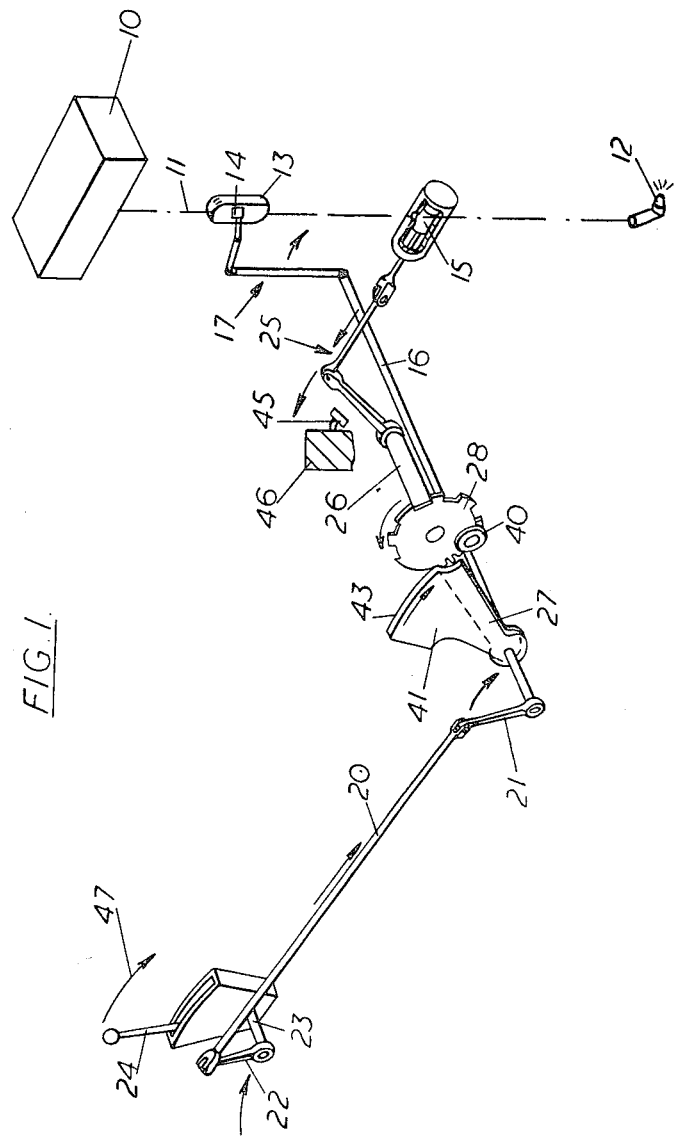

May 4, 1965  B. J. HASKINS  3,181,565
LOST MOTION MECHANISM
Filed Jan. 7, 1963  2 Sheets-Sheet 1

FIG. I.

Inventor
Bernard John Haskins

By
Fred E. Shoemaker
Fred L. Witherspoon, Jr. Attorney

United States Patent Office 3,181,565
Patented May 4, 1965

3,181,565
LOST MOTION MECHANISM
Bernard John Haskins, Derby, England, assignor to Rolls-Royce Limited, Derby, England, a company of Great Britain
Filed Jan. 7, 1963, Ser. No. 249,837
Claims priority, application Great Britain, Jan. 30, 1962, 3,542/62
3 Claims. (Cl. 137—614.11)

This invention concerns a lost motion mechanism.

According to the present invention, there is provided a lost motion mechanism comprising a driven shaft, a driving shaft which is adapted to be rotated through a given angular range in which it transmits drive to the driven shaft and through another angular range in which such drive is not transmitted, two gear members carried respectively by said driving and driven shafts, said gear members meshing with each other when the driving shaft is rotated through the given angular range and being out of mesh with each other when the driving shaft is rotated through the other angular range, and abutment members which engage each other, so as to prevent reverse rotation of the driven shaft, when the driving shaft is being rotated through the said other angular range, the abutment members being out of engagement with each other when the driving shaft is being rotated through the said given angular range.

Preferably the abutment members are respectively rotatable in unison with the driving and driven shafts, the abutment members engaging each other with a relative sliding or rotary movement.

The abutment members are preferably respectively constituted by a roller and by a cam having a surface over which the roller may travel.

The roller may be rotatably mounted on the gear member carried by the driven shaft.

The cam may be mounted on the driving shaft adjacent the gear member carried thereby, the cam having a surface which is cylindrical about the axis of the driving shaft and on which the roller is adapted to roll.

The cam may have a surface which is tangential to the said cylindrical surface and which contacts the roller throughout a limited angular range at the end of the said given angular range, the construction being such that, throughout the said limited angular range, the driving shaft drives the driven shaft by the engagement between the said tangential surface and the roller.

Means are preferably provided for preventing the driven shaft from rotating substantially beyond the angular position, into which it may be positively driven by the driving shaft. Thus the last-mentioned means may comprise a stop which is engageable with the driven shaft or with means secured thereto.

The invention also comprises a gas turbine engine fuel system comprising a fuel reservoir, a fuel conduit through which fuel may flow from the reservoir to engine burners by way of a fuel metering valve and a shut-off cock, and a lost motion mechanism set forth above, the metering valve and shut-off cock being respectively connected to the driving and driven shafts for adjustment thereby, and the driving shaft being rotatable by a pilot's throttle lever, the arrangement being such that, when the pilot's throttle lever is moved away from its inoperative position, the metering valve and shut-off cock are opened simultaneously until the shut-off cock is fully open, after which the metering valve may be opened further without causing movement of the shut-off cock, movement of the pilot's throttle lever towards the inoperative position at first causing closing movement of the metering valve without effecting movement of the shut-off cock and finally causing simultaneous closing movement of both the metering valve and the shut-off cock.

Figure 2:
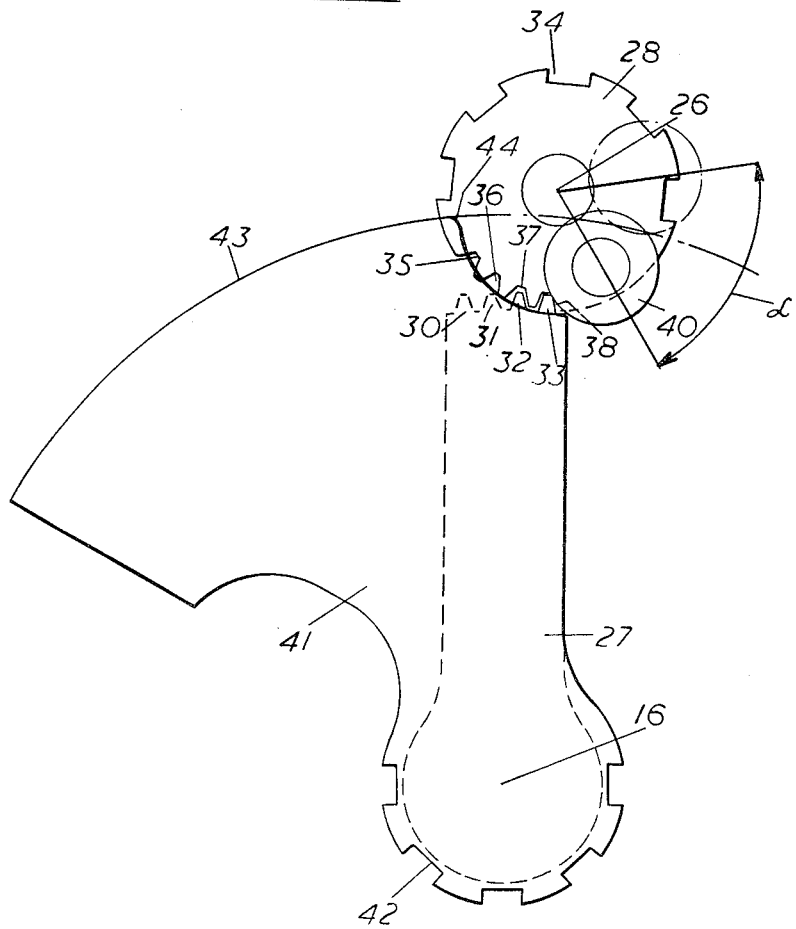

The invention is illustrated, merely by way of example, in the accompanying drawings, in which:

FIGURE 1 is a diagrammatic perspective view of a gas turbine engine fuel system provided with a lost motion mechanism according to the present invention, and FIGURE 2 is an elevation on a larger scale, of the lost motion mechanism shown in FIGURE 1.

Terms such as "left," and "right," "clockwise" and "anti-clockwise" as used in the description below are to be understood to refer to directions as seen in the drawings.

Referring to the drawings, a gas turbine engine fuel system comprises a fuel reservoir 10 and a fuel conduit 11 by means of which fuel may flow from the reservoir 10 to engine burners 12. Connected in the conduit 11 are a fuel control unit 13, having a fuel metering valve 14 therein, and a shut-off cock 15.

The metering valve 14 controls the amount of fuel passing to the burners 12. The position of the metering valve may be automatically adjusted (by means not shown) in functional dependence upon engine variables such as a compressor pressure or pressures and engine speed.

The position of the metering valve 14 is also, however, adjustable by a driving shaft 16 which is diagrammatically shown as being connected to the metering valve 14 by a linkage 17.

The driving shaft 16 is connected to a push rod 20 by a crank 21. The push rod 20 is connected by a crank 22 to a shaft 23 which is rotatable by a pilot's throttle lever 24.

The shut-off cock 15 is connected by a linkage 25 to a driven shaft 26. Mounted on the driving shaft 16 and the driven shaft 26 are gear members 27, 28, respectively. The gear members 27, 28, may, if desired, be housed within a housing (not shown) secured to a ram (not shown) for operating the engine inlet guide vanes.

The gear member 27 (see FIG. 2) is an elongated segmental member having four gear teeth, 30, 31, 32, 33. The gear member 28, which is provided with spannering slots 34, has four tooth spaces, 35, 36, 37, 38 which may respectively mesh with the gear teeth 30, 31, 32, 33. The gear ratio of the gears 27, 28 may, for example, be 105:24.

Rotatably mounted on the gear member 28 is a roller 40 which projects beyond the circumference of the gear member 28. A portion of the surface of the roller 40 is disposed closely adjacent to the right hand side of the tooth space 38.

Mounted on the driving shaft 16 immediately adjacent to the gear member 27 is a cam 41 which is provided with spannering slots 42. The cam 41 has a surface 43 which is cylindrical about the axis of the driving shaft 16, the roller 40 being adapted to roll over the cylindrical surface 43. The cam 41 also has a radiused surface 44 which is tangential to the cylindrical surface 43.

A stop 45, which is carried by fixed structure 46, is adapted to be engaged by the linkage 25, the stop 45 being provided to prevent the driven shaft 26 from being rotated anti-clockwise beyond the angular position into which it will be positively driven by the driving shaft 16.

When the pilot's throttle lever 24 is in the inoperative position shown in FIGURE 1, the gear members 27, 28 are in the position shown in FIGURE 2 in which the gear tooth 33 is in full mesh with the tooth space 38.

As the pilot's throttle lever 24 is moved in the direction of arrow 47 away from the said inoperative position, the driving shaft 16 will be rotated clockwise and the metering valve 14 will be progressively opened. The gear members 27, 28 will, moreover, initially be geared to each other, whereby the driven shaft 26 will be rotated anti-clockwise so as to effect opening movement of the shut-off clock 15.

During the first 45°, say, of rotation of the gear member 28, the gear members 27, 28 are in full mesh. Between 45° and 60°, say, of rotation of the gear member 28, the tooth 30 engages the tooth space 35 but not with pure gear motion.

After the gear member 28 has been rotated through 60° (say), the gear tooth 30 no longer engages the tooth space 35, and the radiused surface 44 engages the roller 40. For the next 10° (say) of movement of the gear member 28, rotation of the driving shaft 16 effects rotation of the driven shaft 26 because of the driving engagement between the radiused surface 44 and the roller 40.

When, however, the gear member 28 has been rotated through the angle α of 70° (which, by reason of the gear ratio between the gear members 27, 28, may correspond to only 17½° of rotation of the driving shaft 16), the shut-off cock 15 is fully open.

Thereafter the pilot's throttle lever 24 may continue to be moved in the direction of the arrow 47 so as to effect up to a further 52½° (say) of rotation of the driving shaft 16. Such further rotation of the driving shaft 16 causes increased opening movement of the metering valve 14 but does not cause movement of the shut-off cock 15 since, as indicated by chain-dotted lines in FIGURE 2, a lot motion will be provided by the roller 40 rolling over the cylindrical surface 43 of the cam 41.

The engagement between the surface 43 and the roller 40 will prevent clockwise rotation of the driven shaft 26 and so will ensure that the shut-off cock 15 is held open, overtravel of the driven shaft 26 in the anti-clockwise direction being prevented by the stop 45.

When, on the other hand, the pilot's throttle lever 24 is moved from a fully open position towards the said inoperative position, the driving shaft 16 will be rotated anti-clockwise. This will cause closing movement of the metering valve 14 but will not at first cause any movement of the shut-off cock 15 since the surface 43 will merely travel in rolling contact with the roller 40.

When, however, the driving shaft 16 has been rotated sufficiently far anti-clockwise, the cylindrical surface 43 will move away from the roller 40. The gear tooth 30 will then enter the tooth space 35 and will immediately mesh therewith by reason of the 10° of anti-clockwise movement which was given to the gear member 28 during the driving engagement between the radiused surface 44 and the roller 40.

Further movement of the pilot's throttle lever 24 towards and into the said inoperative position will therefore cause both anti-clockwise rotation of the driving shaft 16 and (through the meshing of the gear members 27, 28) clockwise rotation of the driven shaft 26, whereby the metering valve 14 and the shut-off cock 15 may be closed simultaneously.

I claim:

1. A gas turbine engine fuel system comprising a fuel reservoir, a fuel conduit through which fuel may flow from the reservoir to engine burners, a fuel metering valve and a shut-off cock in said fuel conduit, a driven shaft and a driving shaft connected respectively for adjustment of the shut-off cock and the metering valve, a pilot's throttle lever for rotating the driving shaft, the pilot's throttle lever being movable between operative and inoperative positions, and a lost motion mechanism so arranged between the driving and driven shafts that movement of the pilot's throttle lever away from its inoperative position causes the driving and driven shafts initially to rotate to open simultaneously the metering valve and the shut-off cock respectively, further movement of the pilot's throttle lever away from its inoperative position after the shut-off cock is fully open causing the metering valve to be opened further without causing movement of the shut-off cock, movement of the pilot's throttle lever towards its inoperative position causes the metering valve to be closed initially without effecting movement of the shut-off cock, and finally causes simultaneous closure of both the metering valve and the shut-off cock.

2. A gas turbine engine fuel system comprising a fuel reservoir, a fuel conduit through which fuel may flow from the reservoir to engine burners, a fuel metering valve and a shut-off cock in said fuel conduit, a driven shaft, a driving shaft, two gear members carried respectively by said driving and driven shaft, said gear members meshing with each other when the driving shaft is rotated through a given angular range and being out of mesh with each other when the driving shaft is rotated through another angular range, a lost motion mechanism comprising abutment members which engage each other so as to prevent reverse rotation of the driven shaft when the driving shaft is being rotated through the said other angular range, the abutment members being out of engagement with each other when the driving shaft is being rotated through the said given angular range, the metering valve and shut-off cock being respectively connected to the driving and driven shafts for adjustment thereby and a pilot's throttle lever for rotating the driving shaft, the pilot's throttle lever being movable between operative and inoperative positions, movement of the pilot's throttle lever away from its inoperative position through the aforementioned given angular range causing the metering valve and shut-off cock to be opened simultaneously until the shut-off cock is fully open, after which the metering valve is opened further without causing movement of the shut-off cock during the aforementioned another angular range, movement of the pilot's throttle lever towards the inoperative position at first causing closing movement of the metering valve without effecting movement of the shut-off cock and finally causing simultaneous closure movement of both the metering valve and the shut-off cock.

3. A gas turbine engine fuel system comprising a fuel reservoir, a fuel conduit through which fuel may flow from the reservoir to engine burners, a fuel metering valve and a shut-off cock in said fuel conduit, a driven shaft, a driving shaft, the metering valve and shut-off cock being respectively connected to the driving and driven shafts, a pilot's throttle lever for rotating the driving shaft, two gear members carried respectively by said driving and driven shafts, said gear members meshing with each other when the driving shaft is rotated through a given angular range and being out of mesh with each other when the driving shaft is rotated through another angular range, a lost motion mechanism comprising a roller rotatably mounted on the gear member carried by the driven shaft, and a cam mounted on the driving shaft adjacent the gear member carried thereby, said cam having a surface over which the roller may travel, said surface being cylindrical about the axis of the driving shaft, said roller and cam engaging each other so as to prevent reverse rotation of the driven shaft when the driving shaft is being rotated through the said other angular range, and said roller and cam being out of engagement with each other when the driving shaft is being rotated through the said given angular range, the cam having a surface which is tangential to the said cylindrical surface and which contacts the roller throughout a limited angular range at the end of the said given angular range, the driving shaft throughout the said limited angular range driving the driven shaft by the engagement between the said tangential surface and the roller, means for preventing the driven shaft from rotating substantially beyond the angular position into which it may be positively driven by the driving shaft.

References Cited by the Examiner

UNITED STATES PATENTS

| | | | |
|---|---|---|---|
| 2,309,559 | 1/43 | Wemp | 74—472.2 |
| 2,339,867 | 1/44 | Mann | 137—630.19 |
| 2,645,947 | 7/53 | Lendved | 74—472.2 |
| 2,767,594 | 10/56 | Du Shane | 74—472.2 |
| 2,949,988 | 8/60 | Morse | 74—472.2 XR |

WILLIAM F. O'DEA, *Primary Examiner.*